United States Patent [19]

Leiber

[11] Patent Number: 4,741,160

[45] Date of Patent: May 3, 1988

[54] HYDRAULIC MULTIPLE-CIRCUIT BRAKE SYSTEM

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 395,554

[22] Filed: Jul. 6, 1982

[30] Foreign Application Priority Data

Mar. 19, 1982 [DE] Fed. Rep. of Germany ....... 3210115

[51] Int. Cl.$^4$ ............................................. F15B 7/00
[52] U.S. Cl. ............................... 60/535; 60/548; 60/565; 60/592
[58] Field of Search ............ 60/534, 535, 547.1, 60/548, 565, 592; 417/40; 137/206, 213, 214

[56] References Cited

U.S. PATENT DOCUMENTS

| | | | |
|---|---|---|---|
| 3,792,433 | 2/1974 | Wada | 60/534 |
| 3,907,375 | 9/1975 | Lewis | 60/535 |
| 4,114,376 | 9/1978 | Cattaneo | 60/548 |
| 4,126,996 | 11/1978 | Leiber | 60/547.1 |
| 4,199,947 | 4/1980 | Mathues | 60/548 |

FOREIGN PATENT DOCUMENTS

| | | | |
|---|---|---|---|
| 606203 | 10/1960 | Canada | 60/548 |
| 622617 | 5/1949 | United Kingdom | 60/548 |

Primary Examiner—Abraham Hershkovitz
Attorney, Agent, or Firm—Edwin E. Greigg

[57] ABSTRACT

A hydraulic multiple-circuit brake system is proposed, the brake amplifier of which has a multiple-chambered refill container. With an intake connection of its pump, an energy supply apparatus comprising a pump and a reservoir is connected at a predetermined fill level (h/2) to the refill chamber which is intended for the supply of an open brake circuit (II). In this manner, it is attained that if there is an energy failure, the open brake circuit will be capable, as a closed brake circuit, of continuing to function.

3 Claims, 1 Drawing Sheet

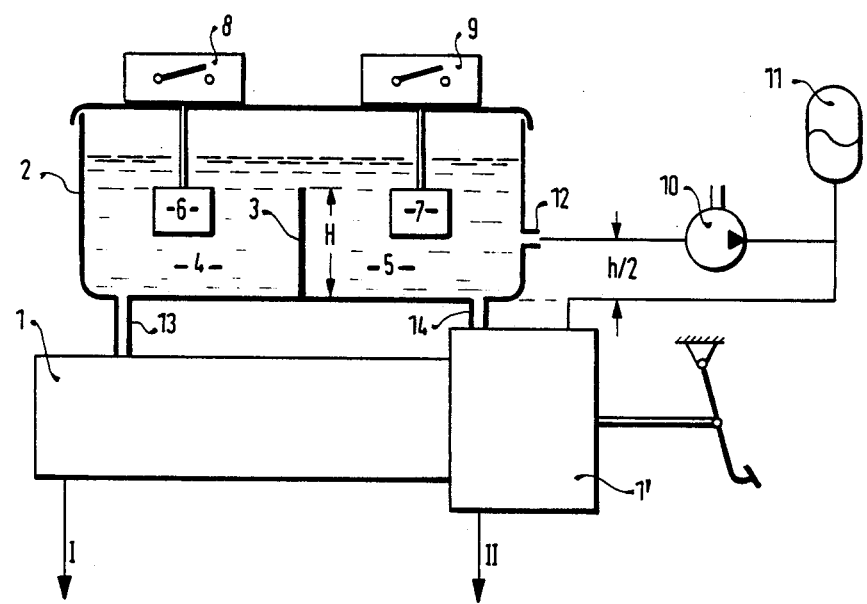

HYDRAULIC MULTIPLE-CIRCUIT BRAKE SYSTEM

BACKGROUND OF THE INVENTION

The invention is based on a hydraulic multiple-circuit brake system having a multiple-circuit brake amplifier for actuating one open brake circuit and one closed brake circuit, the latter closed brake circuit being disposed functionally subsequent to the open brake circuit, and further having an energy supply apparatus comprising a pump and a reservoir and having a multiple-chambered refill container having a separate refill chamber for each brake circuit. A brake system of this kind is known (German Offenlegungschrift No. 2 825 132).

There are various concepts associated with the use of hydraulic brake force amplifiers. These concepts can be divided up into three categories:

Category 1: Brake force amplifiers having two open brake circuits.

Category 2: Brake force amplifiers having one closed brake circuit and one open brake circuit.

Category 3: Brake force amplifiers having two closed brake circuits.

Included in category 1 are normal external-force means or means in which a switchover device is provided to assure that if the energy supply fails, then one or two closed brake circuits are available for use, so that hard braking is still possible mechanically.

Among category 3 systems, auxiliary plunger pistons or, if the system is combined with an anti-slip braking system, feedback pumps are required for pressure modulation; these additional requirements complicate the system.

Category 2 is a mixture, which in some cases is preferred. Purely external force is disadvantageous in the event of an interruption in the energy supply, since no further braking effect can be generated once the hydraulic reservoir has been emptied.

A further consideration is that in multiple-circuit brake amplifiers, the refill containers are subdivided accordingly, so that each circuit has its own reservoir. Both the energy supply apparatus and the corresponding brake circuit are connected to the chamber associated with the open brake circuit. Should the energy supply fail, for instance because of a leak, then the chamber of the refill container will empty, and that brake circuit then fails as well. A remnant braking effect is then attainable only with the other brake circuit.

OBJECT AND SUMMARY OF THE INVENTION

The hydraulic multiple-circuit brake system revealed hereinafter has the advantage over the prior art that the open brake circuit cannot fail in the event of a failure in the energy supply. In that event, the open brake circuit automatically becomes a closed brake circuit and, as such, remains fully operational. Even if the other brake circuit fails, pressure can still be generated with this brake circuit.

The brake system according to the invention is furthermore very simple in structure, because it is necessary merely to attach one pump connection to the brake amplifier at a predetermined fill level of the refill container.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing illustrates an exemplary embodiment of the invention, which will be described in detail below.

DESCRIPTION OF THE PREFERRED EMBODIMENT

A hydraulic multiple-circuit brake system has a dual-circuit brake amplifier 1, which is capable of supplying one closed brake circuit I and one open brake circuit II with a pressure medium. For the brake circuit I, the brake amplifier 1 is embodied as a conventional main cylinder; that is, it has a main cylinder piston and a cylinder, which communicates via a refill port and an expansion port and via a conduit 13 with a refill container 2. A second conduit 14 is provided between an amplifier part 1' of the brake amplifier 1 and the refill container 2.

The refill container 2 has a partition 3, which has a height H equal to approximately two-thirds of the height of the refill container 2. The height of the partition 3 represents the minimum fill level H of the refill container 2. By means of the partition 3, two chambers 4 and 5 are formed in the refill container 2, one chamber (4) for brake circuit I and the other (5) for brake circuit II.

In order to monitor the fill level, floats 6 and 7, respectively, are immersed in each chamber 4 and 5, each float being adapted to cooperate with a respective switch 8 and 9 attached at the top of the refill container 2.

For the brake amplifier 1, the brake system has an energy supply apparatus 10/11, the essential elements of which are a pump 10 and a reservoir 11. An intake connection 12 for the pump 10 is disposed at the level of approximately half the height, or h/2, of the minimum fill level H of the refill container 2.

Mode of Operation

When the brake system is intact, the dual-circuit brake amplifier 1 functions, upon the actuation of the brake pedal, such that in the open brake circuit II, a feedback connection existing by way of the conduit 14 is closed, and the pressure of the energy supply 10/11 displaces a piston in the brake amplifier 1 in such a manner that braking pressure is generated in the open brake circuit II. In accordance with this pressure, the main cylinder piston of the brake circuit I then also travels some distance; its sleeve overtakes the expansion port; and braking also occurs in brake circuit I. The level in the refill container 2, for safety's sake, is above the minimum fill level H.

If the energy supply 10/11 drops, for instance because of a leak or as a result of a failure of the pump, then the refill container 2 empties down to the minimum fill level H, and the chamber 5 then empties further, down to the level h/2. The remaining level is maintained in the chamber 5 and is available for further braking actions, although these will now be unamplified, in brake circuit II. The previously open brake circuit II accordingly becomes a closed brake circuit, in that it comes into action in just the same manner as does brake circuit I. Even if brake circuit I fails as well, the now-closed brake circuit II remains fully capable of functioning.

The refill container chambers 4 and 5 of the open and closed brake circuits I and II are each monitored separately as to their fill level by means of the floats 6 and 7 and the switches 8 and 9. To accomplish this monitoring of the pressure-medium level in these chambers, switching signals of the switches 8 and 9 are evaluated in an electronic switching apparatus. In this manner, the driver is informed at all times as to the fill levels in the refill container 2.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A hydraulic multiple-circuit brake system having a multiple-circuit brake amplifier for actuating one open brake circuit and one closed brake circuit, said closed brake circuit being disposed functionally subsequent to said open brake circuit, said system further having an energy supply apparatus comprising a pump and a reservoir on the pressure side of said pump, said system having a multiple-chambered refill container having a separate refill chamber for each of said brake circuits with a minimum fill level between said separate refill chambers, said minimum fill level being approximately two-thirds the height of said refill container, in which at least one chamber of said refill container is intended for the supply of said open brake circuit (II) said at least one chamber is provided with an intake connection means for said pump, said intake means being established at a level which is approximately half the height (H/2) of the minimum fill level (H) of said refill container.

2. A hydraulic multiple-circuit brake system as defined by claim 1, in which at least said refill container chamber of said open brake circuit has a separate level monitoring means.

3. A hydraulic multiple-circuit brake system as defined by claim 2, in which said level monitoring means comprises plural individually operated electrical switches, the signals of which are evaluatable in an electronic switching apparatus.

* * * * *